N. S. THOMAS.
Preparing Tan-Bark.
No. 88,678. Patented Apr. 6, 1869
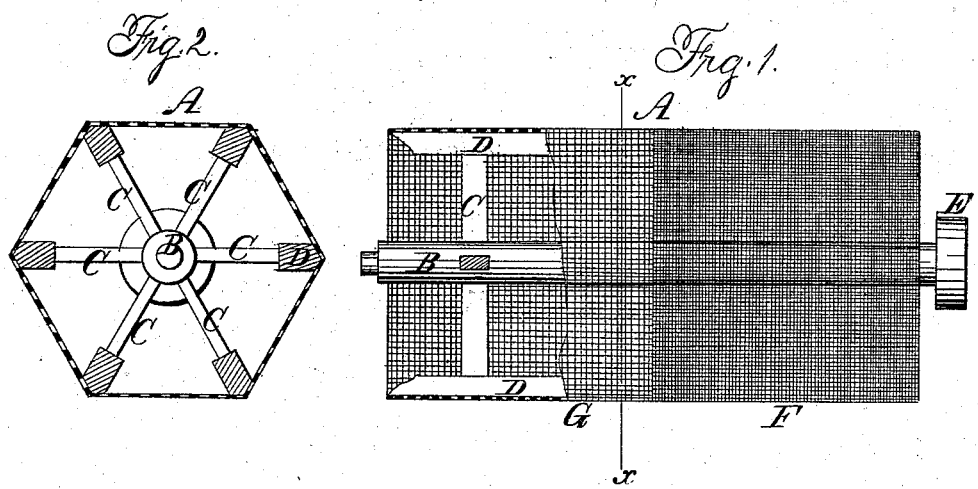

UNITED STATES PATENT OFFICE.

N. SPENCER THOMAS, OF PAINTED POST, NEW YORK.

IMPROVEMENT IN PREPARING TAN-BARK.

Specification forming part of Letters Patent No. 88,678, dated April 6, 1869.

*To all whom it may concern:*

Be it known that I, N. SPENCER THOMAS, of Painted Post, in the county of Steuben and State of New York, have invented a new and useful Improvement in Preparing Tan-Bark; and I do hereby declare that the following is a full, clear, and exact description thereof, which will enable others skilled in the art to make and use the same, reference being had to the accompanying drawings, forming part of this specification.

This invention relates to a new and useful improvement in the process of preparing bark for tanning purposes, whereby the tan-bark used is freed from its impurities and rendered much more suitable for the purpose intended than when prepared in the ordinary manner; and it consists in passing it through a revolving screen, so constructed that the fine dust and other deleterious substances combined with the bark are removed therefrom, and the pure bark reduced to a proper and uniform fineness, or is granulated, all in the manner hereinafter more fully described.

In the accompanying plate of drawings, Figure 1 represents a longitudinal view of a bark-screen made according to my invention. Fig. 2 is a cross-section of Fig. 1 through the line *x x*.

Similar letters of reference indicate corresponding parts.

A represents the screen. It is made by covering a frame or reel composed of a central shaft, B, arms C, and ribs D with woven wire or bolting wire, gauze, or their equivalents. This screen is placed in an inclined position, so that the ground bark will work from one end to the other, and the coarser pieces be discharged from the end, while the dust will be discharged through the finer portion of the screen, and the bark which has been reduced to the proper size will be discharged from the coarser portion. E is the driving-pulley on the screen-shaft. F represents the wire-gauze or finer portion of the screen. G represents the coarser portion.

It is well understood by tanners that when their bark is ground it contains a large amount of matter which comes from the mill in the form of fine dust, which is not only useless as a tanning material, but very injurious, as it clogs up the water or liquor passages and pipes, and prevents the proper action of the liquid on the bark. This dust has its source in the outer coating or "ross" of the bark, which contains no tannin, and in the dirt or earthy matter contained in the crevices or adhering to the outer surface of the bark.

To remove this from the ground bark, and to granulate or reduce the bark used to a proper size or condition of fineness, is my object in this invention.

The ground bark is introduced into the finer end of the screen, which finer portion, F, allows the dust alone to pass through and be separated from the bark. The dust is received into a suitable hopper beneath the screen, and is conveyed away in pipes or spouts. The bark passes from the finer portion, F, of the screen, and the particles which have been reduced to a size to pass through the coarser screen, G, are also received into a hopper, and are conveyed away for use. The coarser pieces of bark, which will not pass through the coarser screen, G, are discharged from the end of the screen, and are conveyed back into the mill, and are subjected to another grinding and screening, which operation is repeated as long as may be necessary to reduce the bark to the required size.

It is evident that the finer the particles of bark within certain limits the more readily and perfectly the tannin will be extracted.

By the removal of the dust the operation of leaching or extracting the tannin is much more complete and we have a much cleaner and purer liquor.

Having thus described my invention, I claim as new and desire to secure by Letters Patent—

1. Separating the dust from ground tan-bark by screening, substantially as and for the purposes described.

2. Sizing or granulating ground tan-bark by screening, substantially as described.

3. The revolving screen A, when used for granulating ground tan-bark or removing the dust therefrom, substantially as shown and described.

N. SPENCER THOMAS.

Witnesses:
 ALBERT R. SAYLES,
 G. W. FRITH.